(No Model.) 2 Sheets—Sheet 2.
C. H. RUSSOM.
MICROMETER.
No. 305,337. Patented Sept. 16, 1884.
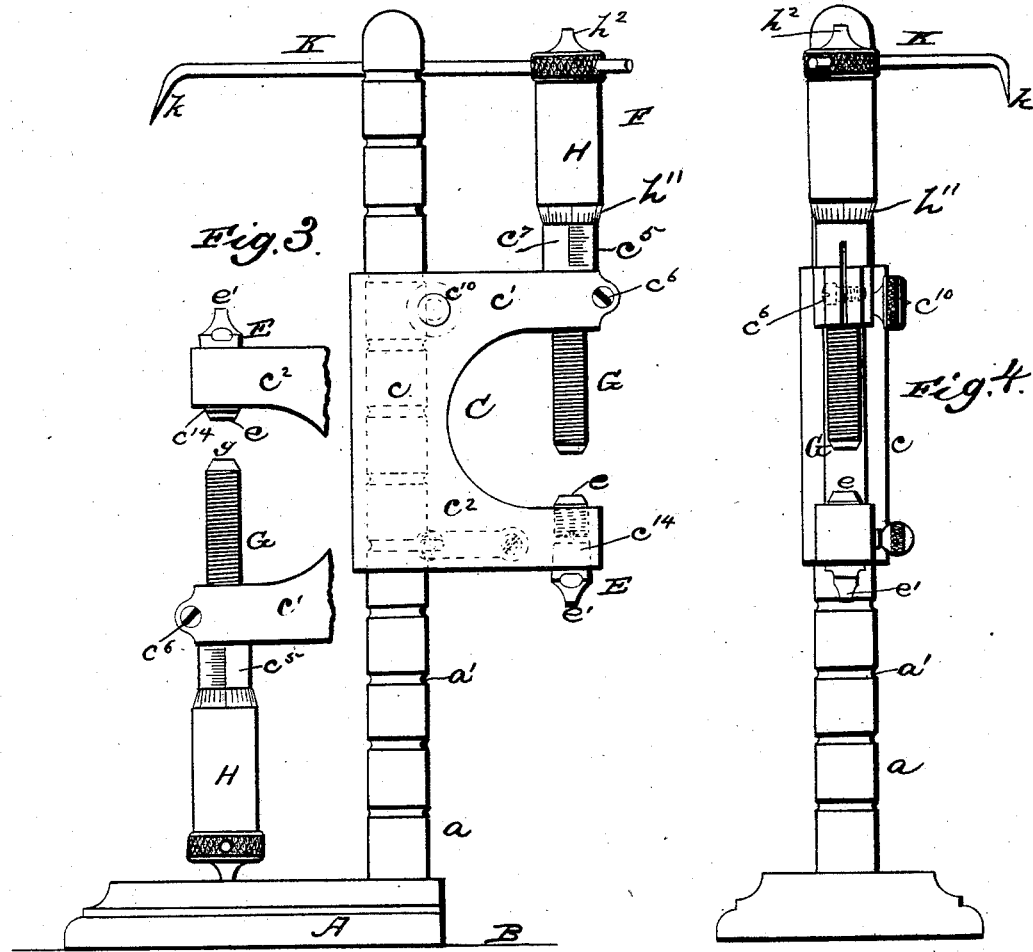
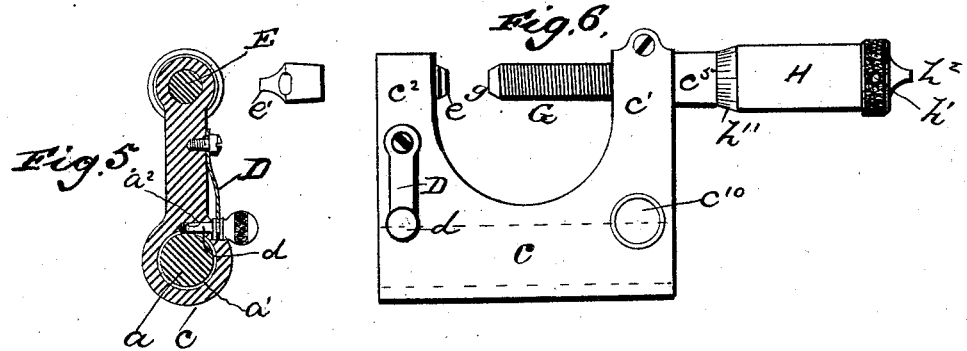
Witnesses:
P. C. Masi
E. H. Bates
Inventor:
C. H. Russom
by Anderson & Smith
his Attorneys

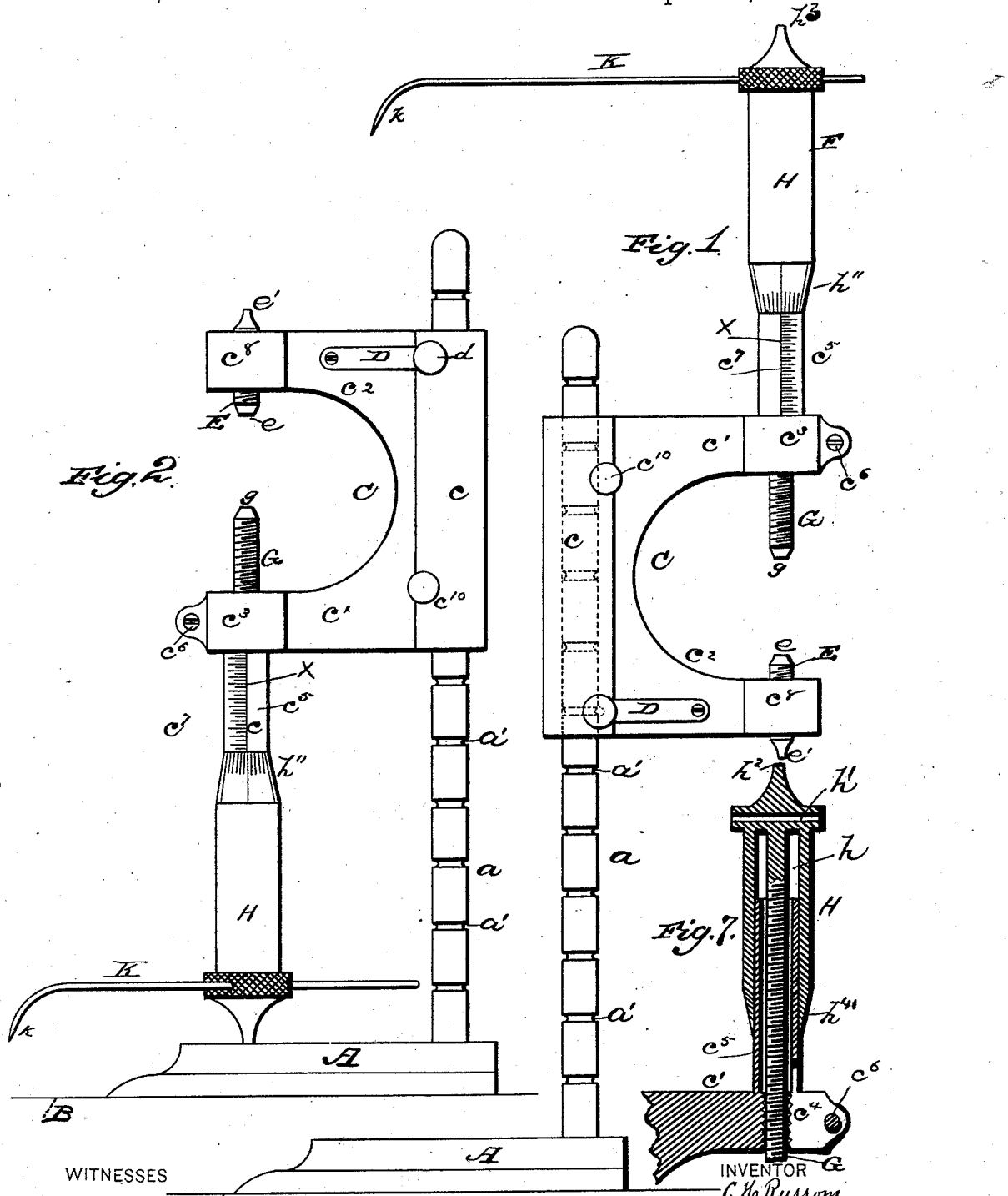

UNITED STATES PATENT OFFICE.

CHARLES H. RUSSOM, OF SPRINGFIELD, ILLINOIS.

MICROMETER.

SPECIFICATION forming part of Letters Patent No. 305,337, dated September 16, 1884.

Application filed June 5, 1884. (No model.)

*To all whom it may concern:*

Be it known that I, CHARLES H. RUSSOM, a citizen of the United States, residing at Springfield, in the county of Sangamon and State of Illinois, have invented certain new and useful Improvements in Micrometers; and I do declare the following to be a full, clear, and exact description of the invention, such as will enable others skilled in the art to make and use the same, reference being had to the accompanying drawings, and to letters or figures of reference marked thereon, which form a part of this specification.

Figures 1 and 2 of the drawings are side views of my device. Fig. 3 is also a side view. Fig. 4 is a front view. Fig. 5 is a transverse section. Fig. 6 is a detail view, and Fig. 7 is a vertical sectional detail view.

The main object of the invention is to construct a gage for planed or other flat work which will be capable of taking very minute measurements; and it mainly consists in supplementing a scale for comparatively large parts—such as inches and half-inches—attached to said gage by a scale for minute parts—for instance, the thousandth part of an inch—operated by a micrometer-screw, hereinafter more fully described. A further object is to so construct the gage that it may be used as calipers for internal work, and also for surface external work.

In the accompanying drawings, A represents the base-plate of the device, having the upright or rod $a$ rising vertically from it at any proper point. The upright $a$ is made of any convenient height, and is graduated to any desirable unit of measure from the lower surface of the base-plate upward—for instance, half-inches—by the horizontal circumscribing-grooves $a'$ $a'$, &c. When the device is being used, the base-plate A rests on any convenient part of the bed B of the planing-machine.

C is the carrier for the gage-point holder, composed of the tubular portion $c$ and the arms $c'$ and $c^2$, extending backward and at right angles to said tubular portion from the upper and lower ends of the same, respectively. The tubular portion $c$ fits snugly over the upright $a$, and is held at any desired point thereon by means hereinafter described.

$c^3$ is the expanded and rounded outer end of the arm $c'$, provided with the internally-threaded vertical opening $c^4$.

$c^5$ is a tube, slit at one end and rising vertically above said opening to any proper height, and $c^6$ is a binding-screw to center the lower end of said tube, for a purpose hereinafter mentioned.

$c^7$ is a vertical scale of equal parts on the outer surface of the tube $c^5$, graduated to any desirable unit of measure—for instance, one-fortieth of an inch. X is the vertical line on said tube upon which the graduations are marked.

$c^8$ is the expanded and rounded outer end of the arm $c^2$, provided with the vertical opening $c^4$, and $c^{10}$ is an adjusting-screw to engage the grooves $a'$ in the upright $a$ and hold the carrier at any desired point thereon.

D is a horizontal leaf-spring fixed by one end to the surface of the carrier, (near the lower edge of the same,) and having attached at right angles to its free end the detent-pin $d$. The detent-pin $d$ enters an opening, $a^2$, in the carrier, and engages with any one of the grooves $a'$, thus holding the carrier at any desired point. This may be held by friction, if necessary.

E is a short rod screwing into the opening $c^4$, with its upper end, $e$, (which projects above said opening,) and its lower end, $e'$, (extending below the opening $c^4$,) pointed, for a purpose hereinafter mentioned. The gage-rod is passed through a transverse opening, $h'$, in the top of the tubular portion H.

$h$ is a space between the rod G and the tubular portion H, for the passage of the tube $c^5$ when the rod G is screwed down. The pointed lower end, $g$, of the rod G may descend far enough to meet the pointed upper end of the piece E.

$h''$ is the beveled lower edge of the tubular portion H, graduated with any number of equal parts—for instance, twenty-five—and fitting snugly over the tube $c^5$. When the holder is turned, any mark of the graduated edge may be brought to the line X, and if the same edge is divided into twenty-five parts each part will represent the twenty-fifth of the distance between any two adjacent threads of the screw $g$.

$h'$ is a horizontal opening through the head of sleeve H, into which is adjustably fitted the horizontal upper gage-marker, K, provided with the depending point $k$, by which the thickness of the work being operated upon is measured.

$h^3$ is a vertical pointer on the upper end of the sleeve H, which, in conjunction with the point $e'$, acts as inside calipers.

The operation of the device is as follows: The base-plate is rested on the bed of the planing-machine at any convenient part, and the point $k$ of the marker K is brought to bear upon the upper surface of the work. The half-inches are then read off the upright A, and fortieths of an inch from the line X on the tube $c^5$. Any measurement less than the fortieth of an inch may be made by turning the proper mark on the beveled edge of the tubular point H into line with the vertical line X on the tube $c^5$.

When the device is made as above described, the distance between any two adjacent threads of the micrometer-screw G should be one-fortieth of an inch. Then each mark on the beveled edge of the tubular portion H would represent one-thousandth part of an inch.

By means of the points $e'$ and $h^3$ the device can be used as internal calipers for tubing and similar work, and by means of the meeting points of $g$ and $e$ it may be used as external calipers for small work.

The device may be used for a number of purposes, among which are the following: first, to set the planer-tool at the proper height, or by removing the piece E the carrier alone may be used for this purpose; second, to find the height of planed work; third, to score a line for the planer-tool to work to; fourth, to caliper large internal work by the outer points of E and F; fifth, to caliper small external work by the inner points of E and F; sixth, the carrier may be laid flat and measurements taken longitudinally.

Having thus fully described my invention, what I claim as new, and desire to secure by Letters Patent, is—

1. The combination, in a gage for planed or other flat work, of the base-plate A, provided with the upright $a$, graduated to any proper unit of measure, with the carrier C, having properly attached the gage-point holder F, provided with proper means to indicate any desired division of the unit of measure of the upright $a$, substantially as specified.

2. In a gage for flat work, the combination, with the base-plate A, provided with the upright $a$, graduated by the grooves $a'$, of the carrier C, having attached the proper holder, F, for the gage-point, and the spring D, provided with the detent $d$, which enters an opening in said carrier and engages any one of the grooves $a'$ $a'$ of the upright $a$, substantially as specified.

3. In a gage, the combination, with the properly-graduated upright $a$ and the carrier C, provided with the graduated tube $c^5$, of the gage-marker K, provided with the point $k$, the gage-point carrier F, composed of the micrometer-screw G and the tubular portion H, having its lower edge beveled and graduated to any desired number of equal parts, substantially as specified.

4. In a gage, the combination of the base-plate A, provided with the properly-graduated upright $a$, and the carrier C, provided with the properly-graduated tube $c^5$, with the gage-point holder F and gage-point $k$, substantially as specified.

5. In a gage, the combination, with the properly-graduated upright $a$ and the carrier C, provided with the arms $c'$ $c^2$, of the rod E, having the pointed lower end, $e'$, and the gage-point holder F, having on its upper end the pointer $h^3$, substantially as specified.

6. In a gage, the combination, with the carrier C, provided with the arms $c'$ and $c^2$ and tube $c^5$, of the rod E, having the pointed upper and lower ends, and the part F, composed of the micrometer-screw $G^2$ and tubular portion H, and having upper and lower pointed ends, substantially as described.

In testimony whereof I affix my signature in presence of two witnesses.

CHARLES HENRY RUSSOM.

Witnesses:
WILLIAM A. GABRIEL,
JACOB BRUNN, Jr.